US008477686B1

(12) United States Patent
Khanka et al.

(10) Patent No.: US 8,477,686 B1
(45) Date of Patent: Jul. 2, 2013

(54) AUTOMATIC INCREASE OF TARGET FRAME ERROR RATE FOR DURATION BASED ON CALL DROP TIMER

(75) Inventors: Bhagwan Khanka, Lenexa, KS (US); Manoj Shetty, Overland Park, KS (US); Sachin R. Vargantwar, Overland Park, KS (US)

(73) Assignee: Sprint Spectrum L.P., Overland Park, KS (US)

( * ) Notice: Subject to any disclaimer, the term of this patent is extended or adjusted under 35 U.S.C. 154(b) by 774 days.

(21) Appl. No.: 12/557,009

(22) Filed: Sep. 10, 2009

(51) Int. Cl.
*H04W 4/00* (2009.01)

(52) U.S. Cl.
USPC .......................................... 370/328; 370/465

(58) Field of Classification Search
USPC ............. 370/318, 328–329, 331–333, 341, 370/433, 437, 443–444, 449–450, 458–459, 370/461–462; 455/422.1, 434, 450, 452.1–452.2, 454–455
See application file for complete search history.

(56) References Cited

U.S. PATENT DOCUMENTS

| | | | |
|---|---|---|---|
| 5,475,861 A | 12/1995 | Hall | |
| 5,828,661 A * | 10/1998 | Weaver et al. | 370/331 |
| 5,914,950 A | 6/1999 | Tiedemann, Jr. et al. | |
| 6,148,207 A | 11/2000 | Baum et al. | |
| 6,154,638 A | 11/2000 | Cheng et al. | |
| 6,347,217 B1 | 2/2002 | Bengtsson et al. | |
| 6,397,043 B1 | 5/2002 | Kang | |
| 6,512,927 B2 * | 1/2003 | Hunzinger | 455/452.1 |
| 6,597,923 B1 | 7/2003 | Vanghi et al. | |
| 6,671,265 B1 * | 12/2003 | Hwang et al. | 370/331 |
| 6,671,512 B2 | 12/2003 | Laakso | |
| 6,757,537 B1 | 6/2004 | Choi et al. | |
| 6,771,700 B1 | 8/2004 | Razoumov et al. | |
| 6,898,192 B2 | 5/2005 | Chheda et al. | |
| 6,944,449 B1 | 9/2005 | Gandhi et al. | |
| 7,027,829 B1 | 4/2006 | Laakso et al. | |
| 7,054,275 B2 | 5/2006 | Kim et al. | |
| 7,072,630 B2 | 7/2006 | Lott et al. | |
| 7,194,281 B2 | 3/2007 | Peng et al. | |
| 7,215,653 B2 | 5/2007 | Kim et al. | |
| 7,242,941 B2 * | 7/2007 | Adatrao et al. | 455/442 |
| 7,260,401 B2 * | 8/2007 | Chen et al. | 455/437 |
| 7,280,510 B2 | 10/2007 | Lohtia et al. | |
| 7,280,511 B2 | 10/2007 | Ahn | |

(Continued)

FOREIGN PATENT DOCUMENTS

KR  20040099837  12/2004

OTHER PUBLICATIONS

U.S. Appl. No. 11/619,348, filed Jan. 3, 2007.
U.S. Appl. No. 11/762,534, filed Jun. 12, 2007.

(Continued)

*Primary Examiner* — Kevin Mew (57) ABSTRACT

Disclosed herein is a method and system to help manage transmission power for wireless communications. A radio access network (RAN) will artificially increase target frame error rate (FER) for certain mobile stations in a coverage area for just a portion of a defined call drop timer period, and the RAN will automatically revert to apply a baseline target FER for a duration sufficient to allow recovery of the mobile station's communications before expiration of the call drop timer period. By increasing the target FER for the mobile stations, noise on the air interface can be reduced. And by reverting the target FER to its baseline level for a sufficient duration, call drops resulting from the increased target FER can be avoided.

20 Claims, 3 Drawing Sheets

U.S. PATENT DOCUMENTS

| | | | |
|---|---|---|---|
| 7,313,398 B1 * | 12/2007 | Ramahi | 455/436 |
| 7,315,573 B2 | 1/2008 | Lusky et al. | |
| 7,392,055 B2 | 6/2008 | Li et al. | |
| 7,403,800 B2 | 7/2008 | Han et al. | |
| 7,499,437 B2 * | 3/2009 | Das et al. | 370/338 |
| 7,522,919 B2 | 4/2009 | Yoon et al. | |
| 7,561,882 B2 * | 7/2009 | Kasapi et al. | 455/450 |
| 7,609,635 B2 | 10/2009 | Bae et al. | |
| 7,668,561 B2 | 2/2010 | Au et al. | |
| 7,676,223 B2 * | 3/2010 | Das et al. | 455/422.1 |
| 7,693,032 B2 | 4/2010 | Li et al. | |
| 7,937,111 B2 | 5/2011 | Ishii et al. | |
| 8,121,596 B1 * | 2/2012 | Shetty et al. | 455/434 |
| 8,170,547 B1 * | 5/2012 | Bhan et al. | 455/424 |
| 2001/0019943 A1 | 9/2001 | Bender et al. | |
| 2002/0094837 A1 | 7/2002 | Hamabe et al. | |
| 2003/0064741 A1 | 4/2003 | Silva et al. | |
| 2003/0086405 A1 | 5/2003 | Silva et al. | |
| 2003/0134656 A1 | 7/2003 | Chang et al. | |
| 2003/0143190 A1 | 7/2003 | Iyer et al. | |
| 2003/0153272 A1 | 8/2003 | Takano | |
| 2003/0206537 A1 | 11/2003 | Choi et al. | |
| 2004/0017792 A1 * | 1/2004 | Khaleghi et al. | 370/335 |
| 2004/0047305 A1 | 3/2004 | Ulupinar | |
| 2004/0146016 A1 | 7/2004 | Kim et al. | |
| 2004/0176042 A1 | 9/2004 | Lott et al. | |
| 2004/0193971 A1 | 9/2004 | Soong et al. | |
| 2004/0213182 A1 | 10/2004 | Huh et al. | |
| 2004/0241803 A1 | 12/2004 | Rosen et al. | |
| 2005/0036462 A1 * | 2/2005 | Sillasto et al. | 370/331 |
| 2005/0041612 A1 | 2/2005 | Zhang et al. | |
| 2005/0053038 A1 | 3/2005 | Kimura | |
| 2005/0107107 A1 | 5/2005 | Shahidi et al. | |
| 2005/0197080 A1 | 9/2005 | Ulupinar et al. | |
| 2005/0201332 A1 | 9/2005 | Bakshi et al. | |
| 2005/0233693 A1 | 10/2005 | Karaoguz et al. | |
| 2005/0288053 A1 | 12/2005 | Gu | |
| 2006/0040697 A1 | 2/2006 | Komatsu | |
| 2006/0045045 A1 | 3/2006 | Blessent et al. | |
| 2006/0223444 A1 | 10/2006 | Gross et al. | |
| 2006/0223565 A1 | 10/2006 | Gandhi et al. | |
| 2006/0234638 A1 | 10/2006 | Mueckenheim et al. | |
| 2006/0275782 A1 | 12/2006 | Gunderson et al. | |
| 2007/0026884 A1 | 2/2007 | Rao | |
| 2007/0129086 A1 | 6/2007 | Toone | |
| 2007/0155395 A1 | 7/2007 | Gopalakrishnan et al. | |
| 2007/0173280 A1 | 7/2007 | Nakayauchi et al. | |
| 2007/0191044 A1 | 8/2007 | Kostic et al. | |
| 2007/0270100 A1 | 11/2007 | Agrawal et al. | |
| 2008/0084841 A1 | 4/2008 | Kim et al. | |
| 2008/0137604 A1 | 6/2008 | Lee | |

OTHER PUBLICATIONS

U.S. Appl. No. 12/026,236, filed Feb. 5, 2008.
U.S. Appl. No. 12/396,908, filed Mar. 3, 2009.
Vijay K. Garg, "IS-95 CDMA and cdma2000—Cellular/PCS Systems Implementation," pp. 181-211, Prentice Hall PTR, 2000.
Lee et al., "New Rate Control Scheme Based on Adaptive RateLimit for 1xEV-DO Reverse Link Traffic Channels," IEEE Communications Letters, vol. 9, No. 10, Oct. 2005.
Yeo and Cho, "An Analytical Model for Reverse Link Rate Control in cdma2000 1xEV-DO Systems," IEEE Communications Letters, vol. 9, No. 3, Mar. 2005.
Tiirola and Ylitalo, "Performance of a UMTS Uplink MIMO Scheme," IEEE, 2003.
Nasri and Marzoug, "Achieving a High Uplink Capacity and Coverage by Using Multicarriers in 3G-WCDMA Systems," IEEE, 2004.
U.S. Appl. No. 11/558,337, filed Nov. 9, 2006.
U.S. Appl. No. 12/179,744, filed Jul. 25, 2008.
U.S. Appl. No. 10/910,835, filed Aug. 4, 2004.
U.S. Appl. No. 12/763,203, filed Apr. 19, 2010.
U.S. Appl. No. 12/763,206, filed Apr. 19, 2010.

* cited by examiner

AUTOMATIC INCREASE OF TARGET FRAME ERROR RATE FOR DURATION BASED ON CALL DROP TIMER

BACKGROUND

In a typical cellular wireless system, an area is divided geographically into a number of cell sites, each defined by a radio frequency (RF) radiation pattern from a respective base transceiver station (base station) antenna. The base station antennas of the cells may then be coupled with other equipment, cooperatively functioning as a radio access network (RAN), which may provide connectivity with a transport network such as the public switched telephone network (PSTN) or the Internet.

When a mobile station (such as a cellular telephone, personal digital assistant, or appropriately equipped portable computer, for instance) is positioned in a cell, the mobile station and base station can communicate with each other in various channels over the RF air interface. Communications from the base station to a mobile station are considered to be in a "forward" direction, so the air interface channels used to carry such communications are referred to as the "forward link" channels. Conversely, communications from an mobile station to the base station are considered to be in a "reverse" direction, so the air interface channels used to carry such communications are referred to as "reverse link" channels.

Communications between a mobile station and a base station will typically suffer from varying levels of interference and signal degradation, due to factors such as (i) the number and power level of mobile stations concurrently communicating over the air interface, (ii) obstructions such as buildings or foliage, and (iii) the distance between the mobile station and the base station. In order to account for this, the power level of signals transmitted between the mobile station and base station can be dynamically adjusted.

To facilitate this on either the forward link or reverse link, a receiving device may monitor the quality of the signals that it receives from the other end and may direct the other end to adjust transmit power based on the measured quality. For instance, a receiving end may monitor the frame error rate (FER) in communications that it receives from the other end and compare the measured FER to a target FER value. If the measured FER is greater than the target FER, then the receiving end may direct the other end to increase transmit power, in an effort to reduce the FER. On the other hand, if the measured FER is less than the target FER, then the receiving end may direct the other end to decrease transmit power, in an effort to avoid unnecessarily strong transmissions that could interfere with other communications.

By way of example, a RAN and mobile station may engage in a two-part power control process for reverse link transmissions. In this process, the base station (e.g., a base station controller) maintains a "setpoint" value, e.g., $E_b/N_o$, which is a decibel measure of the mobile station signal energy to noise (spectral density). The setpoint represents how strong the mobile station signal must be for the base station to be able to successfully receive and decode bits of data transmitted by the mobile station. Given a particular noise level in the air interface, if the received mobile station signal level is not high enough, the base station might not be able to make out the bits of the signal compared to the background noise.

A base station may have an initial setpoint designated by the manufacturer of the base station for use with respect to all mobile stations that the base station serves. Further, the base station may continuously estimate the noise level in the air interface, based on various factors such as FER or signal strength measurements reported by mobile stations, for instance.

When a mobile station is going to engage in a call (e.g., a voice call or data session), the mobile station may select an initial reverse link power level (i.e., the power level at which it will initially transmit to the base station) based on its measurement of received signal power levels. In particular, if the mobile station receives a relatively high strength signal from the base station, the mobile station might logically conclude that it is relatively close to the base station, so it might be programmed to initially transmit to the base station at a relatively low power level. Conversely, if the mobile station receives a relatively low level signal, it might be programmed to initially transmit to the base station at a relatively high power level.

The first part of the reverse link power control process is known as "open loop power control." In open loop power control, the base station measures the power level of the signal that it receives from the mobile station, which will have degraded from the time that it left the mobile station. Given this value and the estimate of noise in the air interface, the base station may then establish a measured value of $E_b/N_o$, which the base station will compare to the setpoint. If the measured $E_b/N_o$ does not match the setpoint, the base station will instruct the mobile station to adjust its transmit power, typically by a predetermined increment. The base station will then establish a new measured $E_b/N_o$ value and compare it to the setpoint, repeating the process until the measured $E_b/N_o$ matches the setpoint.

For instance, if the measured $E_b/N_o$ is too low compared to the setpoint, then the base station may conclude that the mobile station needs to increase its transmit power and may therefore send to the mobile station a signaling message (e.g., a control bit in a predetermined air interface timeslot) instructing the mobile station to increase its transmit power, by 1 dB or by some other defined increment. Similarly, if the measured $E_b/N_o$ is too high compared to the setpoint, then the base station may conclude that the mobile station needs to decrease its transmit power and may therefore send to the mobile station a signaling message instructing the mobile station to decrease its transmit power, again by a 1 dB or another defined increment.

As an example, assume that (i) the initial setpoint is 5 dB, (ii) the mobile station transmits at 10 dBm and (iii) the estimated noise level is −65 dBm. Assume then that the base station measures received mobile station signal energy of −61 dBm. The base station may therefore compute a measured $E_b/N_o$ of 4 dB, which is lower than the setpoint by 1 dB. Consequently, the base station would instruct the mobile station to raise its transmit power by 1 dB. As a result, the base station might then measure received mobile station signal energy of −60 dBm. And the base station may then compute a measured $E_b/N_o$ of 5 dB, which matches the setpoint.

While seeking to match the setpoint, the base station and the mobile station may also engage in the other part of the power control process, which is known as "closed loop power control." In closed loop power control, the base station continuously measures the FER of received mobile station signals, i.e., the percentage of frames on the reverse link that are in error, and the base station compares the measurement to a predetermined FER threshold known as a "target FER". If the measured FER does not match the target FER, the base station will adjust the setpoint used in the open loop power control process, so as to cause the mobile station's transmit power to be adjusted in a manner helps equalize the FER. Thus, the base station will thereby use the target FER as a benchmark to trigger adjustment of the setpoint and thus to trigger an adjustment in mobile station transmit power.

In particular, if the base station determines that the measured FER is greater than the target FER, then the base station may conclude that the setpoint should be increased so that higher mobile station transmit power will be allowed and the FER can be decreased. Thus, the base station may increase the setpoint by an increment such as 1 dB for instance. As a result, the setpoint may be pushed higher than the measured $E_b/N_o$, and so, in the open loop power control process, the base station will instruct the mobile station to increase its transmit power, thus likely resulting in decreased FER.

On the other hand, if the measured FER is less than the target FER, then the base station may conclude that the setpoint can be reduced so as to limit the mobile station transmit power (and thus hopefully reduce noise that would be experienced by others) while maintaining transmission quality within the target FER. Therefore, in such a situation, the base station may reduce the setpoint, similarly by an increment such as 1 dB for instance. And as a result, the setpoint may be pushed lower than the measured $E_b/N_o$, so the base station will instruct the mobile station to reduce its transmit power, thus likely resulting in increased FER.

SUMMARY

In general, the target FER value may be set by engineering design for a given cell site or other wireless coverage area and fixed for all operation in that coverage area. By applying a suitable target FER value, the base station can ideally allow mobile stations in the coverage area to maintain an acceptable level of call quality while avoiding the introduction of excessive noise in the coverage area. In particular, with a suitable target FER value, a mobile station will tend to transmit with a high enough power level to allow its communications to be received and decoded successfully by the base station while not transmitting at so high a power level as to seriously impact other communications occurring on the air interface.

If it would be possible to increase the target FER for mobile stations in a given coverage area (i.e., artificially increase the FER, perhaps substantially, beyond its normal setting) while still allowing communications from those mobile stations to be sufficiently received and decoded by the RAN, then the noise level in the coverage area should decrease as mobile station transmissions would tend to occur at lower power levels. Unfortunately, however, if the target FER is increased too much, the base station will not be able to successfully receive and decode communications from the mobile stations, and the result would likely be that mobile station calls would be dropped.

In this regard, for each mobile station engaged in a call, a base station will typically apply a "call drop timer" according to which if the base station does not successfully receive and decode communications from the mobile station for a defined time period, the base station will consider the mobile station's call to be dropped and will release air interface resources that were devoted to the call. If the target FER is increased too much for such a mobile station and remains increased for the duration of the call drop timer period, the mobile station's call will therefore be dropped.

Disclosed herein is an innovative method and system to help reconcile these issues. As presently contemplated, the target FER will be increased for at least some mobile stations in a coverage area for just a portion of the call drop timer period, so as to help reduce overall noise in the coverage area, but the target FER will be restored or set to its normal level for those mobile stations for the remainder of the call drop timer period, thus giving the mobile stations time to recover from poor communication quality. In particular, as long as the target FER is restored to its normal level (i.e., not artificially increased) for a sufficient portion of the call drop timer period, the power control process should operate before the expiration of the call drop timer to cause the affected mobile stations to increase their transmission power up to a level where the base station would be able to successfully receive and decode communications from the mobile stations. As a result, the mobile stations' communications would not be threshold poor for the entire duration of the call drop timer period, and so the mobile stations calls would not be dropped.

In practice, for instance, the base station may artificially increase the target FER for at least some of the mobile stations in the coverage area for just half of the call drop timer period. That would leave the mobile stations with the remaining half of the call drop timer period to recover from the poor level of communications and to thus have the base station revert to successfully receiving and decoding communications from the mobile stations before expiration of the call drop time period. While half of the call drop timer period is believed to allow a sufficient recovery time to avoid dropped calls, other portions of the call drop timer period could be used instead. For example, the base station could artificially increase the target FER for one quarter of the call drop timer period, leaving three quarters of the call drop timer period for recovery to avoid call drops. And as another example, the base station could artificially increase the target FER for two thirds of the call drop timer period, leaving one third of the call drop timer period for recovery to avoid call drops.

The extent of increase in target FER may be paired with the duration of the increase. For example, the base station could be set to double the target FER for half of the call drop timer period. As another example, the base station could be set to triple the target FER for half of the call drop timer period. And as another example, the base station could be set to double the target FER for two thirds of the call drop timer period. The particular level of increase and duration in relation to the call drop timer period may be refined through experience.

Preferably, the base station would apply this method with respect to the mobile stations that are currently engaged in calls in the coverage area at issue, i.e., the "active" mobile stations. When the base station artificially increases the target FER for the defined portion of the call drop timer period, the base station may do so with respect to all of the active mobile stations in the coverage area. Alternatively, the base station may do so with respect to just a portion of the active mobile stations in the coverage area.

In a presently preferred implementation, for instance, the base station may increase the target FER for just a proper subset (e.g., half, one quarter, or some other proper subset) of the currently active mobile stations. Upon passage of defined portion of the call drop timer period, the base station may then revert the target FER for those active mobile stations to its normal level, and the base station may then increase the target FER for a different proper subset of the currently active mobile stations. Preferably, there would be no overlap between members of the two proper subsets, so that no active mobile station would be impacted by greater than the defined duration of increased target FER. Further, the base station could regularly continue this process, first increasing the target FER for one proper subset of currently active mobile stations in the coverage area but for just a defined portion of the call drop timer period of the coverage area, next increasing the target FER for another proper subset of the currently active mobile stations in the coverage area but for just the defined portion of the call drop timer period and with the proper subset not including any members of the immediately preceding proper subset, and so forth. Through this process, the base station may negatively impact the call quality for just a proper subset of the currently active mobile stations at any given time.

Advantageously, the present method should in theory result in decreased noise in the air interface while not reducing the quality of any call for so long that a call drop would result. By allowing mobile stations to transmit with lower power as a result, the method may further increase system capacity and save mobile station battery life.

These as well as other aspects, advantages and alternatives will become apparent to those of ordinary skill in the art by reading the following detailed description, with reference where appropriate to the accompanying drawings. Further, it should be understood that the description provided in this document, including this overview, is intended as an example only and is not intended to limit the scope of the invention as claimed.

DETAILED DESCRIPTION

Referring to the drawings, as noted above, FIG. 1 is a simplified block diagram of a system in which an exemplary embodiment of the present method can be implemented. Shown at the core of the system is a radio access network (RAN) 12 that serves to provide various mobile stations 14 with connectivity to one or more transport networks. In the example arrangement shown, RAN 12 includes a representative base transceiver station (BTS) 16, a base station controller (BSC) 18, a mobile switching center (MSC) 20, and a packet data serving node (PDSN) 22. However, a suitable RAN can take any of a variety of other forms without limitation.

Figure 1:
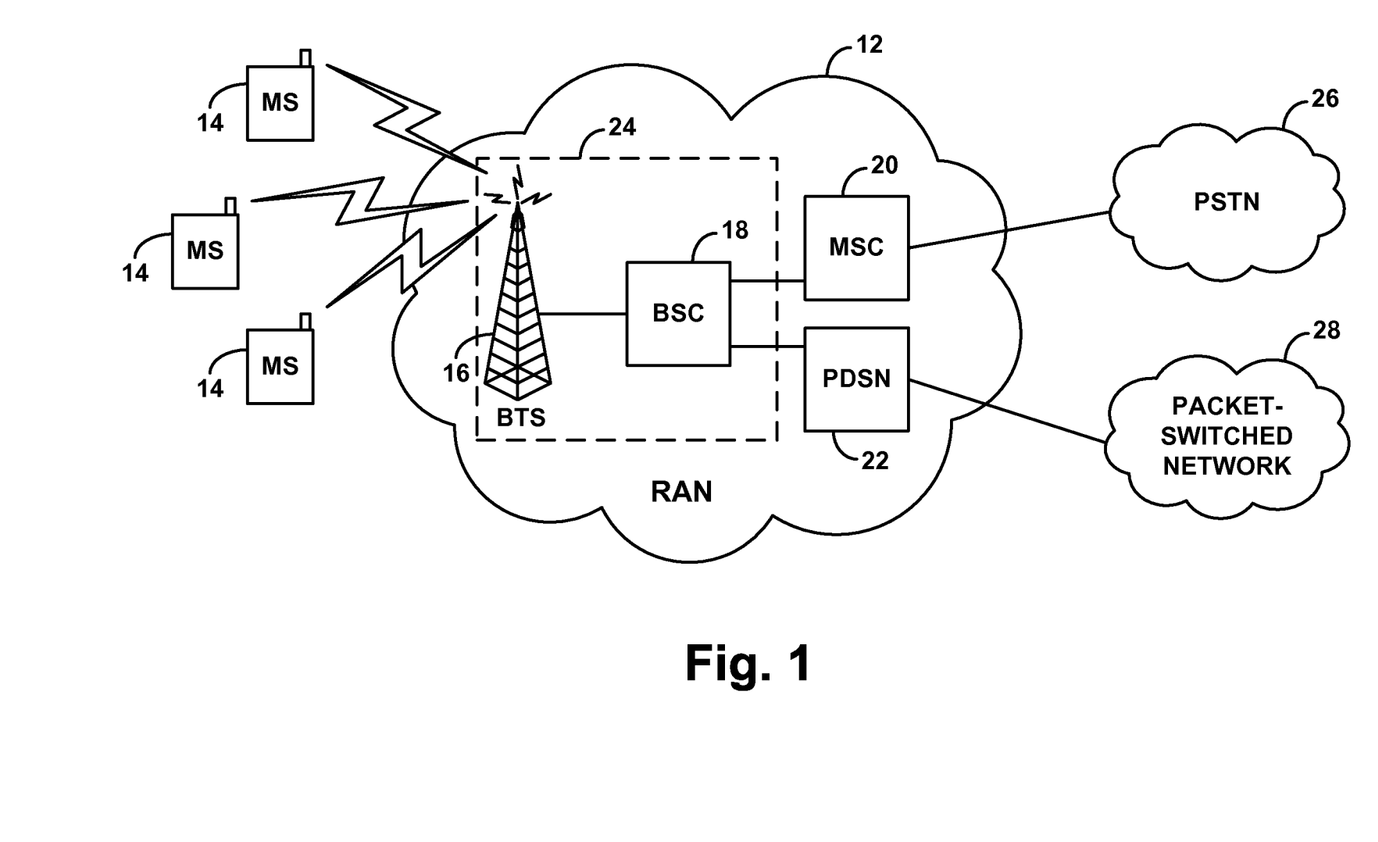
FIG. 1 is a simplified block diagram of a system in which an exemplary embodiment of the present method can be implemented.

In the example arrangement, the BTS 16 includes an antenna structure and associated equipment that allows the BTS to engage in air interface communication with one or more served mobile stations according to any agreed air interface protocol now known or later developed, examples of which include without limitation CDMA (e.g., 1×RTT, 1×EV-DO), iDEN, WiMAX (e.g., IEEE 802.16), LTE, TDMA, AMPS, GSM, GPRS, UMTS, or EDGE. The antenna structure may be situated on an antenna tower and may radiate to define one or more wireless coverage areas, such as a cell and one or more cell sectors for instance, each of which can be defined by respective air interface parameters, such as frequencies, modulation codes, and the like. BSC 18, in turn, may control one or more BTSs such as example BTS 16 for instance, such as to manage BTS transmission power and handoff of communications between BTSs for instance. Alternatively or additionally, the BTS may take the form of a femtocell, typically situated in a home, office, or other such setting, which may be coupled through a wired or wireless broadband link with other RAN components.

As shown, BTS 16 and BSC 18 may cooperatively define a "base station" 24 or base station system, which may function to carry out various aspects of the present method. As such, aspects of the method may be carried out by BTS 16, by BSC 18, or by a combination of BTS 16 and BSC 18. Further, aspects of the method can be carried out by other entities instead or addition.

MSC 20 and PDSN 22 function to provide connectivity with various transport networks so as to allow served mobile stations to engage in communications on those networks. For instance, MSC 20 may provide connectivity with the Public Switched Telephone Network (PSTN) 26, typically to allow served mobile stations to engage in voice-band telephone network communications with entities on that network. And PDSN 22 may function as a network access server or gateway to provide connectivity with a packet-switched network 28 such as public Internet and/or a private packet network, typically to allow served mobile stations to engage in packet-switched network communications with entities on that network.

As noted above, the air interface defined between the BTS and served mobile stations includes one or more "forward link" channels extending from the BTS to the mobile stations and one or more "reverse link" channels extending from the mobile stations to the BTS. These channels will vary depending on the air interface protocol in use. In general, however, the channels may define various control channels for setting up and controlling communications and various traffic channels for carrying bearer traffic. The channels within a coverage area may be defined in various ways, such as through with frequency division multiplexing, time division multiplexing, and/or code division multiplexing.

In practice, when a mobile station is operating within a coverage area but does not have an assigned air interface traffic channel or connection through which to engage in bearer communication (e.g., voice communication and/or packet-data communication), the mobile station may be considered "idle" or "dormant." In that state, the above discussed power control process need not occur, as there is no active bearer communication to be power controlled.

When an idle or dormant mobile station seeks to initiate bearer communication, the mobile station may transmit via an air interface access channel to the BTS an origination message. In response, the RAN may assign an air interface traffic channel or other connection parameters for use by the mobile station so as to establish or facilitate use of a radio link through which the mobile station can engage in bearer communication with the RAN. Further, the RAN may set up other aspects of the desired communication as well, to allow the communication to proceed. For instance, when a mobile station places a legacy voice call, the BSC may assign an air interface traffic channel for use by the mobile station, and the MSC may engage in signaling over the PSTN to set up the call with a called party. Likewise, when a mobile station seeks to establish wireless packet-data connectivity, the BSC may assign an air interface traffic channel for use by the mobile station, and the PDSN may set up a data link layer connection (e.g., Point-to-Point Protocol session) with the mobile station and arrange for assignment of an Internet Protocol (IP) address for use by the mobile station.

When a mobile station is idle or dormant and the RAN receives a bearer communication destined to the mobile station, the RAN may page the mobile station over an air interface paging channel and the mobile station may respond to the page over an air interface access channel. The RAN may then similarly assign an air interface traffic channel or other connection parameters for use by the mobile station so as to establish or facilitate use of a radio link through which the mobile station can engage in bearer communication with the RAN, again possibly PSTN or wireless packet-data communication.

When an air interface traffic channel or other such connection is assigned for use by the mobile station, the mobile station is considered to be "active," and a power control process such as that described above will preferably apply to control the power of mobile station transmissions. In practice, the base station will maintain a record of which mobile stations are currently active, so as to facilitate engaging in the power control process with respect to those mobile stations. The present method may then optimally be applied with respect to those active mobile stations.

In general, the served "mobile stations" in this process can be any types of devices that are served by the RAN, examples of which include without limitation cell phones, wirelessly-equipped personal digital assistants or computers, wireless routers, and wireless equipped appliances and other devices. The term "mobile station" is used to designate such devices regardless of whether the devices are in fact movable/mobile. Each mobile station should be equipped with components to be able to communicate with the serving base station according to an agreed air interface protocol, such as one of those noted above for instance.

Figure 2:
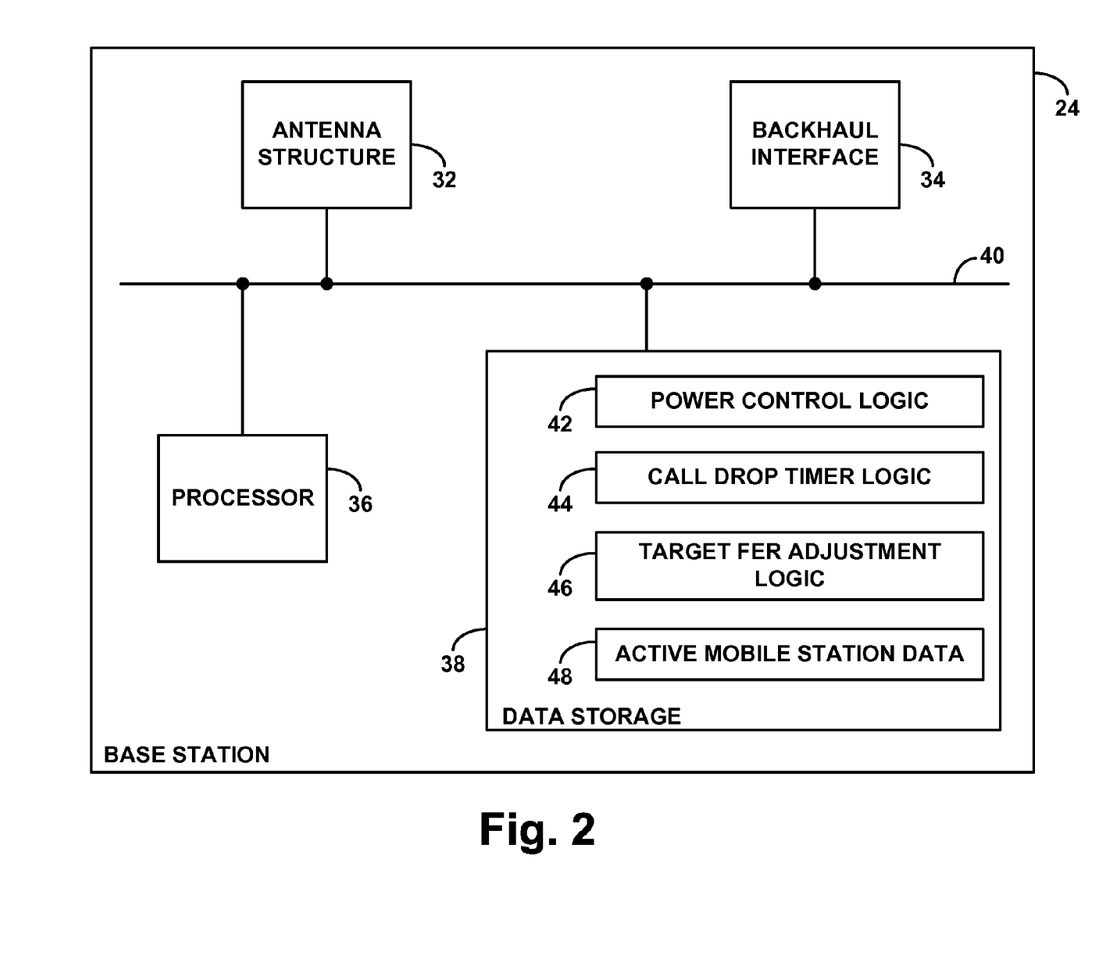
FIG. 2 is a simplified block diagram of a base station including components for implementing the method.

FIG. 2 is next a simplified block diagram of a base station 24, showing functional components that can be included in the base station in order to implement aspects of the present method. As shown, the base station includes an antenna structure 32, a backhaul interface 34, a processor 36, and data storage 38, all of which may be coupled together or otherwise communicatively linked by a system bus, network, or other connection mechanism 40.

Antenna structure 32 as noted above may be mounted on an antenna tower or may be coupled with table-top housing as in the case of a typical femtocell for instance. Preferably, the antenna structure includes or is coupled with a power amplifier (not shown) for amplifying forward link communications, so as to facilitate receipt of those communications by served mobile stations, and a wireless communication module for engaging in air interface communication according to the agreed air interface protocol.

Backhaul interface 34 in turn comprises a link for coupling with other RAN components. For instance, if the base station is principally BTS 16, then the backhaul interface 34 may provide for connection with BSC 18. The backhaul interface 34 may take various forms depending on the type of connection provided between the base station and other RAN components.

Processor 36 may comprise one or more general purpose processors (e.g., INTEL processors) and/or one or more special purpose processors (e.g., application specific integrated circuits and/or digital signal processors). Data storage 38, in turn, may comprise one or more volatile and/or non-volatile storage components, such as optical, magnetic, or organic storage components, and may be integrated in whole or in part with processor 36.

As shown, data storage 38 includes power control logic 42, call drop timer logic 44, and target FER adjustment logic 46. Each of these logic components may take the form of program logic executable by processor 36. Alternatively, similar logic could be provided through hardware, or through any suitable combination of software, firmware, and/or hardware. Further, although these logical components are discussed here with respect to base station 24, it will be understood that the functions discussed could more generally be implemented by any one or more components of RAN 12.

In practice, power control logic 42 is executable by the processor to control the power of reverse link communications by served mobile stations. In accordance with the example open/closed loop power control process discussed above, for instance, the base station 24 may apply a baseline target FER in controlling power of the communications. In particular, the base station may measure the FER of received mobile station communications, compare the measured FER with the target FER, and adjust a power setpoint for the mobile station in accordance with that comparison, so as to effect an increase or decrease in mobile station transmission power while keeping FER at a level that is believed to be sufficient to allow the base station to receive and decode the mobile station communications.

As the base station applies the power control process with respect to each active mobile station in the coverage area at issue, the base station will thus preferably have a record of which mobile stations are currently active. Data storage 38 may thus also include active mobile station data 48, defining the set of such mobile stations and thus defining the mobile stations to which the present method can be usefully applied.

Call drop timer logic 44 is executable by the processor to provide call drop timer functionality as described above, and particularly to treat a mobile station's call as dropped when the base station has not successfully received and decoded communications from the mobile station for a call drop timer period. This logic can apply with respect to a legacy voice call (e.g., a typical PSTN voice-band call) and can apply as well with respect to wireless packet-data communications. In either case, when the base station concludes that a mobile station's call is dropped, the base station may release radio link resources that were assigned for use by the mobile station. For instance, the base station may release an air interface traffic channel that was assigned for use by the mobile station, thus completing the call drop. If such a call drop occurs when a user of the mobile station was engaged in a call and did not intend the call to be ended, the call drop can result in poor user experience and is thus undesirable.

Target FER adjustment logic 46 is executable by the processor to implement the target FER adjustment functions of the present method. In particular, applying target FER adjustment logic 46, (i) base station 24 may automatically apply an increased target FER for a subset of the active mobile stations for a first duration that is defined as a portion of the call drop timer period, and (ii) upon passage of the first duration of applying the increased target FER for the subset of the active mobile stations, base station 24 may automatically revert to apply the baseline target FER for the subset of active mobile stations for at least a second duration defined as another portion of the call drop timer period. Optimally, the application of the baseline target FER for the second duration will be sufficient to facilitate recovery of communications from the mobile stations of the subset before expiration of the call drop timer period and to thereby prevent call drops.

More particularly, by applying the increased target FER for the subset of the active mobile stations for the first duration, the reverse link transmission power of those active mobile stations will tend to decrease (because higher FER will be tolerated). As a result, the FER measured by the base station may be so high that the base station may be unable to successfully receive and decode reverse link communications from the affected mobile stations, thus triggering the start of the call drop timer. If that poor reverse link communication by a mobile station continues for the entire length of the call drop timer, the mobile station's call will be considered dropped. However, by reverting to apply the baseline target FER for a sufficient portion of the call drop timer period, the mobile station's reverse link transmission power will begin to rise, thus decreasing the FER and allowing the base station to successfully receive and decode the mobile station's communications. As long as the base station gets back to successfully receiving and decoding the mobile station's communications before the call drop timer period expires, the mobile station's call will not be dropped, and thus a call drop resulting from the increased target FER would have been prevented.

As noted above, according to the present method, the base station may carry out this functionality with respect to a subset of the active mobile stations at a time and may thus apply the method first with respect to one subset of the active mobile stations, and then with respect to another subset of the active mobile stations, and so forth, preferably without any overlap between the subsets of active mobile stations (i.e., where the subsets are mutually exclusive proper subsets of the active mobile stations). A benefit of this process is that, while one subset of the active mobile stations has its transmission power reduced by this process, the transmissions by those mobile stations may interfere less with those of other active mobile stations. Overall, it is believed that this process should thus have a positive impact, again without increasing the call drop rate. Alternatively, however, the process could be applied for all of the active mobile stations at once. Other variations are possible as well.

Figure 3:
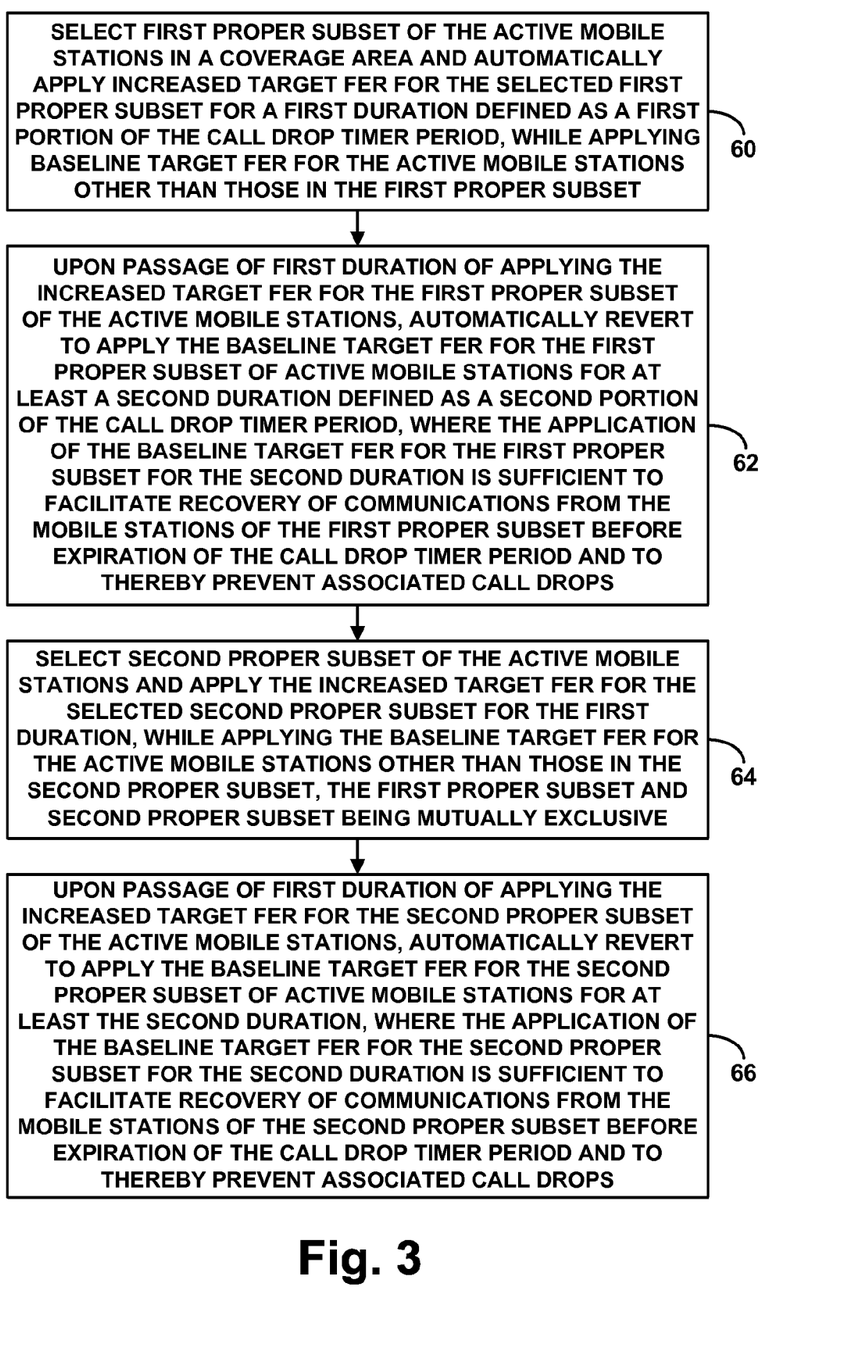
FIG. 3 is a flow chart depicting functions that can be implemented in accordance with the method.

FIG. 3 is next a flow chart depicting functions that can be implemented in accordance with the present method. This method is preferably implemented by a RAN that is serving various mobile stations in a wireless coverage area defined by the RAN, where the RAN normally applies a baseline target FER in controlling power of communications by the mobile stations, and where the RAN applies a call drop timer according to which the RAN treats a mobile station's call as dropped when the RAN has not successfully received and decoded communications from the mobile station for a call drop timer period. The method may be applied repeatedly, to help reduce air interface noise while helping to avoid an increase in call drops.

As shown in the figure at block 60, the RAN selects a first proper subset of the active mobile stations and applies an increased target FER for the selected first proper subset for a first duration defined as a first portion of the call drop timer period, while applying the baseline target FER for the active mobile stations other than those in the first proper subset.

As noted above, the first proper subset can be, by way of example, half or some other designated portion of the currently active mobile stations in the coverage area. The RAN may select the first proper subset randomly from among the active mobile stations, but the RAN preferably avoids selecting as members of the first proper subset any mobile stations that were subjected to increased target FER in an immediately preceding iteration, or that have not yet recovered from application of an increased target FER. Furthermore, as also noted above, the increased target FER can be, by way of example, double the baseline target FER or can be some other multiple (greater than 1) of the baseline target FER.

Continuing in FIG. 3, at block 62, upon passage of the first duration of applying the increased target FER for the first proper subset of the active mobile stations, the RAN will automatically revert to apply the baseline target FER for the first proper subset of active mobile stations for at least a second duration defined as a second portion of the call drop timer period. In this regard, as noted above, the first portion of the call drop timer period could be defined as the period of time that is half of the call drop timer period, which would leave the remaining half of the call drop timer period for recovery. More generally, the first portion of the call drop timer could be set to any value, provided that the second portion of the call drop period would be sufficient time before expiration of the call drop timer for recovery of communications from the mobile stations (namely to begin successfully receiving and decoding communications from the mobile stations) once the target FER has been returned to its baseline level, so as to thereby prevent call drops (e.g., those arising due to the artificially increased target FER).

At block 64, the RAN selects a second proper subset of the active mobile stations and applies the increased target FER for the selected second proper subset for the first duration, while applying the baseline target FER for the active mobile stations other than those in the second proper subset. Preferably, as noted above, the first proper subset and second proper subset are mutually exclusive. Further, it should be understood that the RAN may or may not wait for completion of the function of block 62 before carrying out the function of block 64. In one example implementation, for instance, the RAN may increase the target FER for the second proper subset when the RAN reverts the target FER back to its baseline level for the first proper subset. But in another example implementation, the RAN may wait until expiration of the second duration of applying the baseline target FER for the first proper subset before increasing the target FER for the second proper subset. Other examples are possible as well.

At block 66, upon passage of the first duration of applying the increased target FER for the second proper subset of the active mobile stations, the RAN automatically reverts to apply the baseline target FER for the second proper subset of active mobile stations for at least the second duration. And again, the first and second durations are preferably selected such that the application of the baseline target FER for the second proper subset for the second duration is sufficient to facilitate recovery of communications from the mobile stations of the second proper subset before expiration of the call drop timer period and to thereby prevent call drops (e.g., those arising due to the artificially increased target FER).

An exemplary embodiment has been described above. Those of ordinary skill in the art will appreciate, however, that numerous variations from the embodiment described are possible while remaining within the scope of the invention as claimed. For example, although the foregoing description discusses applying the same increase, duration, and portion of mobile stations for each subsequent iteration of increasing target FER, it should be understood that each iteration could use different values of these parameters. Other examples are possible as well.

We claim:

1. A method implemented by a radio access network (RAN), the RAN serving a plurality of active mobile stations in a wireless coverage area defined by the RAN, the RAN normally applying a baseline target frame error rate (FER) in controlling power of communications by the active mobile stations, and the RAN applying a call drop timer according to which the RAN treats a mobile station's call as dropped when the RAN has not successfully received and decoded communications from the mobile station for a call drop timer period, the method comprising:

the RAN automatically applying an increased target FER for a subset of the active mobile stations for a first duration defined as a first portion of the call drop timer period; and upon passage of the first duration of applying the increased target FER for the subset of the active mobile stations, the RAN automatically reverting to apply the baseline target FER for the subset of active mobile stations for at least a second duration defined as a second portion of the call drop timer period, the application of the baseline target FER for the second duration being sufficient to facilitate recovery of communications from the active mobile stations of the subset before expiration of the call drop timer period and to thereby prevent call drops.

2. The method of claim 1, wherein the subset is all of the active mobile stations in the coverage area.

3. The method of claim 1, wherein the subset is a first proper subset of the active mobile stations in the coverage area.

4. The method of claim 3, wherein the first proper subset of the active mobile stations in the coverage area is half of all the active mobile stations in the coverage area.

5. The method of claim 4, wherein the increased target FER is double the baseline target FER.

6. The method of claim 5, wherein the first portion of the call drop timer period is half of the call drop timer period.

7. The method of claim 3, further comprising:
after passage of the first duration of applying the increased target FER for the first proper subset of the active mobile stations, the RAN automatically applying the increased target FER for a second proper subset of the active mobile stations for the first duration, the first proper subset and second proper subset being mutually exclusive;
upon passage of the first duration of applying the increased target FER for the second proper subset of the active mobile stations, the RAN automatically reverting to apply the baseline target FER for the second proper subset of active mobile stations for at least the second duration.

8. The method of claim 1, wherein the first portion of the call drop timer period is half of the call drop timer period.

9. The method of claim 1, wherein the increased target FER is double the baseline target FER.

10. The method of claim 1, the coverage area being a cell sector, and the method being implemented by a base station controller that serves the cell sector.

11. The method of claim 1, wherein applying the increased target FER comprises using the increased target FER as a benchmark to trigger adjustment of a power control setpoint for mobile station transmissions, and adjusting mobile station transmit power based on comparisons with the power control setpoint.

12. A radio access network (RAN) comprising:
a base station having an antenna structure that engages in air interface communication with active mobile stations in a coverage area defined by the RAN;
power control logic executable by the RAN to control power of communications by the mobile stations, wherein according to the power control logic the RAN normally applies a baseline target frame error rate (FER) in controlling power of the communications;
call drop timer logic executable by the RAN to treat a mobile station's call as dropped when the RAN has not successfully received and decoded communications from the mobile station for a call drop timer period;
target FER adjustment logic executable by the RAN (i) to automatically apply an increased target FER for a subset of the active mobile stations for a first duration defined as a first portion of the call drop timer period, and (ii) upon passage of the first duration of applying the increased target FER for the subset of the active mobile stations, to automatically revert to apply the baseline target FER for the subset of the active mobile stations for at least a second duration defined as a second portion of the call drop timer period, the application of the baseline target FER for the second duration being sufficient to facilitate recovery of communications from the active mobile stations of the subset before expiration of the call drop timer period and to thereby prevent call drops.

13. The RAN of claim 12, further comprising a base station controller controlling the base station, wherein the power control logic, call drop timer logic, and target FER adjustment logic are implemented by the base station controller.

14. The RAN of claim 12, wherein the subset is all of the active mobile stations in the coverage area.

15. The RAN of claim 12, wherein the subset is a first proper subset of the active mobile stations in the coverage area.

16. The RAN of claim 15, wherein the target FER adjustment logic further executable by the RAN (i) after passage of the first duration of applying the increased target FER for the first proper subset of the active mobile stations, to automatically apply the increased target FER for a second proper subset of the active mobile stations for the first duration, the first proper subset and second proper subset being mutually exclusive, and (ii) upon passage of the first duration of applying the increased target FER for the second proper subset of the active mobile stations, to automatically revert to apply the baseline target FER for the second proper subset of active mobile stations for at least the second duration.

17. A method implemented by a radio access network (RAN), the RAN serving a plurality of active mobile stations in a wireless coverage area defined by the RAN, the RAN normally applying a baseline target frame error rate (FER) in controlling power of communications by the active mobile stations, and the RAN applying a call drop timer according to which the RAN treats a mobile station's call as dropped when the RAN has not successfully received and decoded communications from the mobile station for a call drop timer period, the method comprising:
the RAN selecting a first proper subset of the active mobile stations and applying an increased target FER for the selected first proper subset for a first duration defined as a first portion of the call drop timer period, while applying the baseline target FER for the active mobile stations other than those in the first proper subset;
upon passage of the first duration of applying the increased target FER for the first proper subset of the active mobile stations, the RAN automatically reverting to apply the baseline target FER for the first proper subset of active mobile stations for at least a second duration defined as a second portion of the call drop timer period, the application of the baseline target FER for the first proper subset for the second duration being sufficient to facilitate recovery of communications from the active mobile stations of the first proper subset before expiration of the call drop timer period and to thereby prevent call drops;
the RAN selecting a second proper subset of the active mobile stations and applying the increased target FER for the selected second proper subset for the first duration, while applying the baseline target FER for the active mobile stations other than those in the second proper subset, the first proper subset and second proper subset being mutually exclusive; and
upon passage of the first duration of applying the increased target FER for the second proper subset of the active mobile stations, the RAN automatically reverting to apply the baseline target FER for the second proper subset of active mobile stations for at least the second duration, the application of the baseline target FER for the second proper subset for the second duration being sufficient to facilitate recovery of communications from the active mobile stations of the second proper subset before expiration of the call drop timer period and to thereby prevent call drops.

18. The method of claim 17, wherein the first duration is half of the call drop timer period.

19. The method of claim 17, wherein the first proper subset is half of all the active mobile stations.

20. The method of claim 17, wherein the increased target FER is double the baseline target FER.

* * * * *